United States Patent
Barthel et al.

(10) Patent No.: US 9,599,079 B2
(45) Date of Patent: Mar. 21, 2017

(54) MOTOR VEHICLE ASSEMBLY UNIT AND METHOD FOR THE PRODUCTION OF THE MOTOR VEHICLE ASSEMBLY UNIT

(71) Applicant: TI Automotive (Fuldabrüch) GmbH, Fuldabrüch (DE)

(72) Inventors: Iris Barthel, Schauenburg (DE); Alexander Bol, Guntershausen (DE); Hans Jensen, Dettingen unter Teck (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 606 days.

(21) Appl. No.: 14/092,143

(22) Filed: Nov. 27, 2013

(65) Prior Publication Data

US 2014/0144410 A1 May 29, 2014
US 2016/0208751 A9 Jul. 21, 2016

(30) Foreign Application Priority Data

Nov. 28, 2012 (EP) .................................... 12194662

(51) Int. Cl.
*F16L 33/22* (2006.01)
*F02M 55/00* (2006.01)
(Continued)

(52) U.S. Cl.
CPC ............ *F02M 55/004* (2013.01); *B23P 11/00* (2013.01); *B29D 23/003* (2013.01);
(Continued)

(58) Field of Classification Search
CPC .... F16L 33/225; F16L 33/227; F16L 33/2071
(Continued)

(56) References Cited

U.S. PATENT DOCUMENTS 3,262,721 A * 7/1966 Knight .................. F16L 33/227
285/242
3,340,762 A * 9/1967 Bennett ............... F16B 19/1081
285/3

(Continued)

FOREIGN PATENT DOCUMENTS

DE      43 04 680 C1    4/1994
EP      1 267 113 A1   12/2002

OTHER PUBLICATIONS

European Patent Office, European Search Report in European Patent Application No. EP 12 19 4662 (May 17, 2013).

*Primary Examiner* — David E Bochna
(74) *Attorney, Agent, or Firm* — Brinks Gilson & Lione

(57) ABSTRACT

A motor vehicle assembly unit having a connector, in particular a quick connector, and having a motor vehicle fluid line, wherein the connector includes an insertion end for inserting the fluid line, wherein there is a securing spike on the insertion end, which is encompassed by an outer sleeve. An annular insertion space for the fluid line or a fluid line end of the fluid line is disposed between the securing spike and the outer sleeve. The outer sleeve is connected to the securing spike by means of at least one break-away element, that breaks when the fluid line is inserted in the annular insertion space, such that the outer sleeve can be slid onto the securing spike, or further slid onto the securing spike from, or with, the fluid line.

15 Claims, 4 Drawing Sheets

(51) Int. Cl.
   *B23P 11/00* (2006.01)
   *B29D 23/00* (2006.01)

(52) U.S. Cl.
   CPC ........... *F16L 33/225* (2013.01); *F16L 33/227* (2013.01); *Y10T 29/49826* (2015.01)

(58) Field of Classification Search
   USPC .............................. 285/3, 4, 242, 255, 259
   See application file for complete search history.

(56) References Cited

U.S. PATENT DOCUMENTS

| | | | | |
|---|---|---|---|---|
| 3,885,819 A * | 5/1975 | Egerer | ................... | F16L 37/05 285/93 |
| 4,205,417 A * | 6/1980 | Mackal | ............ | A61M 25/1018 285/3 |
| 4,239,313 A * | 12/1980 | Parr | ................... | H01R 9/0518 285/3 |
| 4,278,279 A * | 7/1981 | Zimmerman | ......... | F16L 33/226 285/255 |
| 4,750,764 A * | 6/1988 | Gibellina | .............. | F16L 33/225 285/255 |
| 4,775,173 A * | 10/1988 | Sauer | ................... | F16L 33/221 285/921 |
| 4,946,200 A * | 8/1990 | Blenkush | ............... | F16L 33/225 285/255 |
| 5,284,368 A * | 2/1994 | Oetiker | ................. | F16L 33/225 285/255 |
| 5,911,443 A * | 6/1999 | Le Quere | ............ | F16L 37/0915 285/3 |
| 6,231,085 B1 * | 5/2001 | Olson | .................... | F16L 33/225 285/255 |
| 6,416,085 B1 * | 7/2002 | Markovic | ............. | F16L 33/225 285/242 |
| 7,032,933 B2 * | 4/2006 | Hellman | ................. | F16L 25/14 285/3 |
| 7,063,359 B2 * | 6/2006 | Vallee | ................. | F16L 37/0915 285/3 |
| 7,118,136 B2 * | 10/2006 | Ohya | .................... | F16L 33/225 285/3 |
| 7,370,889 B2 * | 5/2008 | Maunder | ............... | F16L 33/225 285/242 |
| 7,455,324 B2 * | 11/2008 | Inoue | .................... | F16L 33/227 285/242 |
| 7,922,213 B2 * | 4/2011 | Werth | .................... | F16L 33/225 285/242 |
| 8,141,913 B2 * | 3/2012 | Kern-Emmerich | . | F16L 33/2075 285/242 |
| 2008/0169646 A1 * | 7/2008 | Werth | .................... | F16L 33/225 285/243 |

\* cited by examiner

MOTOR VEHICLE ASSEMBLY UNIT AND METHOD FOR THE PRODUCTION OF THE MOTOR VEHICLE ASSEMBLY UNIT

CROSS-REFERENCE TO RELATED APPLICATIONS

This patent application claims priority pursuant to Title 35 USC Section 119 to European Patent Application No. 12 194 662.8-1751 filed Nov. 28, 2012 entitled "Motor Vehicle Assembly Unit and Method for the Production of the Motor Vehicle Assembly Unit," the entire specification and drawings of which are hereby incorporated by reference herein as if fully set forth.

TECHNICAL FIELD

The invention concerns a motor vehicle assembly unit comprising a connector—in particular a quick connector—and a motor vehicle fluid line. The invention furthermore concerns a method for the production of a motor vehicle assembly unit comprising a connector—in particular a quick connector—and a motor vehicle fluid line. A motor vehicle fluid line means a line for liquid media in a motor vehicle, in particular for fuel, brake fluid or for a urea solution, for example, for a catalytic converter in the motor vehicle.

BACKGROUND

Motor vehicle assembly units of the type described above are known in the field in different embodiments. As such, the connection of motor vehicle fluid lines made of plastic, for example polyamide 12, by means of a connector or quick connector, respectively, is known, in which the fluid line engages in a form-locking or friction locking manner in an engagement section of the connector. The providing of a securing profile in the engaging section of the connector, for an improved securing of the fluid line, is also known. Many of the known motor vehicle assembly units have the disadvantage, however, that the fluid line is no longer sufficiently functionally reliably and effectively attached to the connector at higher pressures and/or at higher temperatures. The use of hose clamps or similar items for improving the attachment is time-consuming or costly, and is accompanied by geometric limitations. Many known motor vehicle assembly units furthermore have the disadvantage that the fluid line ends that are to be connected to the connector are relatively unprotected with respect to liquid media, in particular corrosive liquid media, for example, with respect to spray water.

SUMMARY

In this respect, the invention addresses the technical problem of providing a motor vehicle assembly unit of the type specified above, in which the advantages described above can be effectively avoided. Moreover, the invention addresses the technical problem of providing a method for the production of a motor vehicle assembly unit of this type.

To solve the technical problem, the invention teaches of a motor vehicle assembly unit comprising a connector—in particular a quick connector—and a motor vehicle fluid line, wherein the connector includes an insertion end for inserting in the fluid line, wherein there is a securing spike on the insertion end, surrounded by an outer sleeve, wherein an annular insertion space for the fluid line, or for a fluid line end of the fluid line, respectively, is disposed between the securing spike and the outer sleeve, wherein the outer sleeve is connected to the securing spike by means of at least one break-away element, wherein the at least one break-away element is constructed such that when the fluid line end is slid onto the securing spike, or when the fluid line end is slid into the annular insertion space, respectively, it breaks or tears, such that the outer sleeve can be slid from, or with, respectively, the inserted fluid line onto the securing spike, or further onto the securing spike, respectively.

The motor vehicle fluid line shall be referred to in short as a fluid line in the following. A fluid line means, as well, a hose that is to be connected to the connector. For practical purposes, the fluid line has a circular cross-section, or a substantially circular cross-section, respectively. It is within the scope of the invention that the fluid line is slid onto the securing spike of the connector, such that it preferably is retained in a force-locking or friction locking manner, when in the assembled state, between the securing spike and the outer sleeve. It is within the scope of the invention that the outer sleeve is cylindrical, or substantially cylindrical in design. It is furthermore within the scope of the invention that the securing spike is hollow in its interior, in order to allow the passage of the liquid medium. Preferably, the connector, or quick connector, respectively, is made of plastic, or is substantially made of plastic. The at least one break-away element forms a break-away location in the invention according to the invention, which is to be broken off or torn off in a targeted manner.

It is within the scope of the invention that the connector according to the invention is a quick connector. Ideally, the connector, or quick connector, respectively, includes a connection section, which is equipped with a tube receiving opening for accommodating a tube. According to a preferred embodiment, the tube receiving opening includes at least one locking projection, or a plurality of locking projections, wherein the locking projection, or projections, respectively, can be engaged with by at least one projection element on the outer surface of the tube. For practical purposes, the projection element on the tube is designed in the shape of an annular buckling, or in the shape of an annular projection. In the connected state, this buckling, or this projection, respectively, then engages behind a locking projection or projections, respectively, in the tube receiving opening of the connector, or the quick connector, respectively. The tube is, in particular, a connecting element for a further fluid line.

According to a particularly preferred embodiment of the invention, the securing spike includes at least one securing contour, preferably numerous securing contours, on its outer surface. It is within the scope of the invention thereby that the fluid line can be slid onto the securing contour or securing contours, respectively, in a force-locking or friction-locking manner. For practical purposes, the fluid line, or fluid line end, respectively, at least in the fully assembled state, is clamped, or retained in form-locking/friction-locking manner, respectively, between the securing spike, or between the at least one securing contour, respectively, and the outer sleeve, in the annular insertion space. Ideally, in this state a relative turning of the connector and fluid line is prevented. In the assembled state, or when fully slid together, the securing contour or securing contours, respectively, lies/lie directly on the inner surface of the fluid line, at least in the region of the outer sleeve. It is within the scope of the invention that the securing contour, or securing contours, respectively, encompass the external circumference of the securing spike. According to a preferred embodiment of the invention, at least two securing contours are disposed behind one another in the longitudinal axis of the securing spike.

It is within the scope of the invention that the outer sleeve is first disposed on the front end of the securing spike at the end facing the fluid line. As such, the outer sleeve is connected to the securing spike by at least one break-away element. It is furthermore within the scope of the invention that the at least one break-away element is disposed on the front end of the outer sleeve at the connection section end. For practical purposes, the at least one break-away element is disposed directly on the front end of the outer sleeve at the connection section end, or the break-away element is an integral part of this front end, respectively. According to one embodiment of the invention, the at least one break-away element runs over the inner circumference of the outer sleeve, or over the outer circumference of the securing spike, respectively. It is also within the scope of the invention, however, that numerous break-away elements are provided, running on the inner circumference of the outer sleeve.

According to a particularly recommended embodiment of the invention, the outer sleeve includes a pressuring flange at the connection section end, which presses against the front end of the fluid line when it is slid onto the securing spike, or slid further thereon, respectively, such that the outer sleeve, with the fluid line, can be slid onto the securing spike, or slid further onto the securing spike, respectively. When slid onto the securing spike, the fluid line thus pushes the outer sleeve in front of it for practical purposes. Preferably, the pressuring flange of the outer sleeve runs over the inner circumference of the outer sleeve. It is also possible, however, that individual flange sections, interrupted by gaps, are distributed over the inner circumference of the outer sleeve. It is recommended that the at least one break-away element is connected to the pressuring flange at the securing spike end, or, respectively, that a remainder of the break-away element is connected to the pressuring flange at the securing spike end, after the break-away element has been broken.

A very preferred embodiment of the invention is characterized in that the outer sleeve lies with its front end against a stopping flange after it has been slid onto the securing spike, or after it has been fully slid onto the securing spike. Thus, it is within the scope of the invention that the outer sleeve comes to lie against the stopping flange at its connection section-side front end when fully slid onto the securing spike. For practical purposes, the stopping flange runs over the outer circumference of the connector. Preferably, the stopping surface of this stopping flange is oriented such that it is perpendicular, or substantially perpendicular, to the longitudinal axis L of the connector. Ideally, the front end surface of the connection section-side front end of the outer sleeve is disposed such that it is perpendicular, or substantially perpendicular, to the longitudinal axis L of the connector. It is within the scope of the invention that the stopping flange of the connector is disposed on the end of the securing spike at the connection section end.

According to a recommended embodiment of the invention, the securing spike includes a conical section, wherein the cone of the conical section tapers toward the fluid line-side front end of the securing spike. For practical purposes, the outer sleeve can be slid in a force-locking or friction locking manner onto the conical section. It is recommended that the outer sleeve, particularly at the end of the assembly procedure, is basically clamped onto the conical section of the securing spike. It is within the scope of the invention that the conical section of the securing spike is disposed in front of the stopping flange of the connector, seen from the direction in which the outer sleeve, or fluid line, respectively, is slid onto the connector. For practical purposes, the outer sleeve, with its pressuring flange, can be slid onto the conical section of the securing spike, in a force-locking or friction locking manner. Ideally, after being slid on, or fully slid on, respectively, the pressuring flange lies in a pressurized manner, or pretensioned manner, respectively, on the cone of the conical section. Preferably, after the outer sleeve has been slid on, or after it has been fully slid on, respectively, a front end of the fluid line lies against the pressuring flange of the outer sleeve. Due to this sealing contact, the fluid line end is effectively protected against external influences, such as spray water, for example.

A particularly recommended embodiment of the invention is characterized in that the at least one securing contour of the securing spike includes a conical section, or in that the numerous securing contours each include a conical section, respectively. For practical purposes, the respective cone of the conical section tapers toward the front end of the securing spike at the fluid line end. This preferred embodiment of the conical section facilitates the sliding of the fluid line onto the securing spike, or the sliding against the outer sleeve, respectively. According to a preferred embodiment of the invention, the at least one securing contour, or the securing contours, respectively, are designed in the form of saw teeth.

It is within the scope of the invention that, prior to being slid onto the fluid line, the outer sleeve is connected as an integral part thereof to the securing spike via at least one break-away element. For practical purposes, the outer sleeve and the securing spike are designed as a one-piece injection molded component. It is recommended that the outer sleeve is molded to the securing spike, or the connector, respectively, via the at least one break-away element. When the fluid line is slid onto the securing spike, the at least one break-away element breaks.

It is furthermore within the scope of the invention that at least one inner basic element of the connector—in particular having the connection section, the securing spike and the connecting sleeve, is designed as a single plastic element, and in particular as a single injection molded component. Fundamentally, the basic element can be the entire connector. It is, however, also possible that the basic element of the connector is coated with a plastic and/or located in a housing by means of insertion molding. Ideally the basic element of the connector includes a metal section, or a metal section disposed between the connection section and the securing spike, respectively.

A method for the production of a motor vehicle assembly unit comprising a connector—in particular a quick connector—and a motor vehicle fluid line is also the subject matter of the invention, wherein a basic element of the connector has a securing spike and an insertion end, and has an outer sleeve that encompasses the securing spike, and is connected to the securing spike by means of at least one break-away element, wherein a fluid line end of the fluid line is inserted into an annular insertion space formed between the outer sleeve and the securing spike, such that the at least one break-away element breaks, and wherein the assembly comprises a fluid line or fluid line end, respectively, and outer sleeve is subsequently slid, or further slid, respectively, onto the securing spike. In the framework of the invention, the basic element of the connector is produced by means of an injection molding procedure.

The invention is based on the understanding that with the motor vehicle assembly unit according to the invention, a very functionally reliable and effective attachment of the motor vehicle fluid line to the connector is obtained. This connection is also resistant to higher pressures and/or temperatures. The motor vehicle assembly unit can be created in a simple, less time-consuming, and, particularly, less expensive manner. The invention furthermore includes the advantage that particles, which occur in the production of the connection between the connector and the fluid line, are retained in the intermediate space between the outer sleeve and the securing spike, and thus do not contaminate the system or the assembly. Moreover, the fluid line end connected to the connector is not exposed to the environment, or influences from the environment, respectively, and moreover, is accommodated in the intermediate space between the outer sleeve and the securing spike in a sealed manner. In this manner, a spray water protection against saltwater or similar fluids is obtained for the fluid line end. The design according to the invention for the motor vehicle assembly unit also offers an effective control function, for ensuring that the fluid line is fully slid onto the securing spike. When the connection section-side front end of the outer sleeve rests fully, or in a form-locking manner, against the stopping flange of the connector, it can be assumed that the fluid line is fully slid on, and thus the connection is produced in functionally reliable and effective manner.

BRIEF DESCRIPTION OF THE DRAWINGS

In the following, the invention shall be explained in greater detail based on drawings depicting a single embodiment example. They show, in a schematic depiction.

DETAILED DESCRIPTION OF THE DRAWINGS

Figure 1:
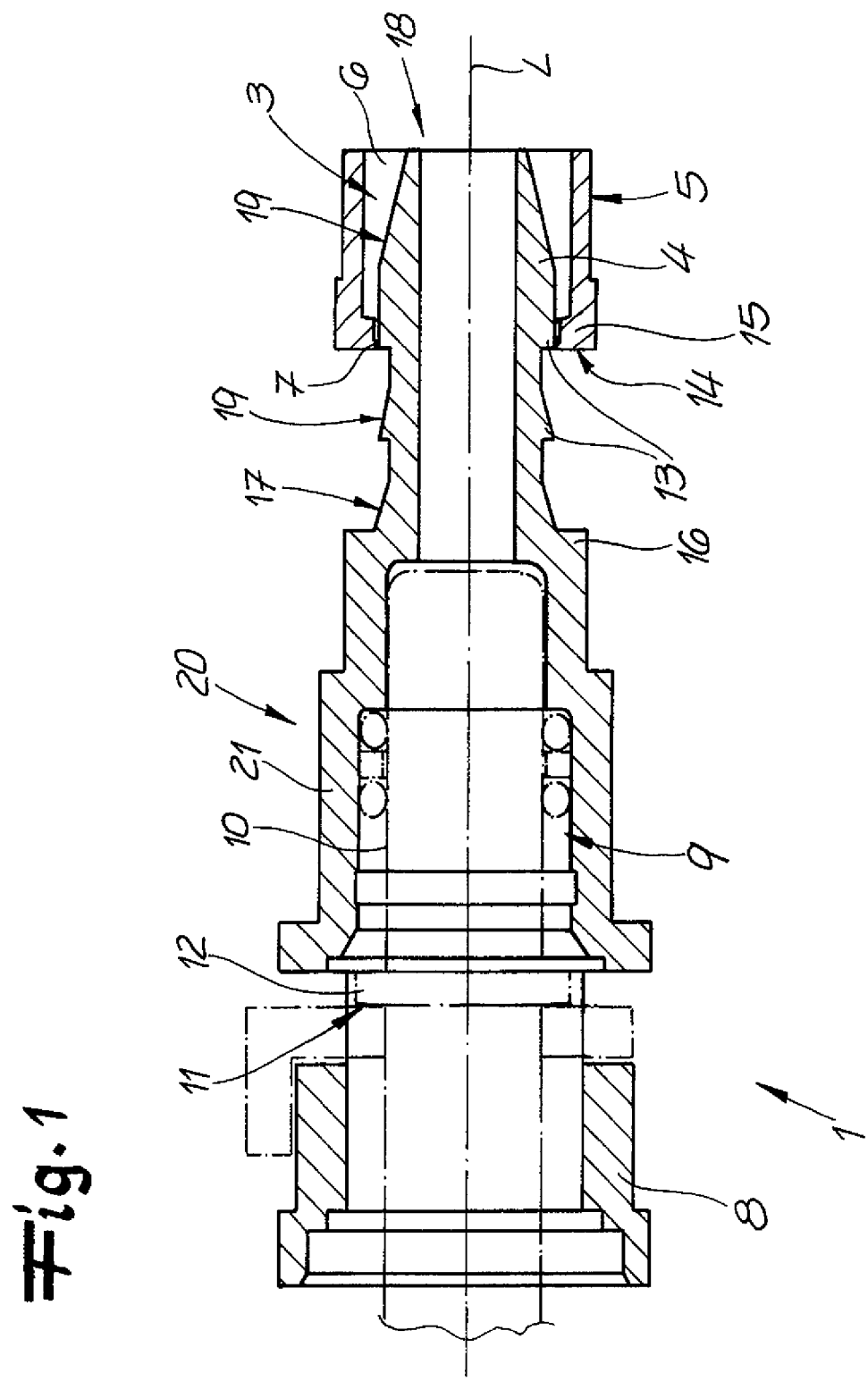
FIG. 1 a motor vehicle assembly unit according to the invention, in a first functional position, FIG. 2 the subject matter of FIG. 1 in a second functional position, FIG. 3 the subject matter of FIG. 1 in a third functional position, and FIG. 4 the subject matter of FIG. 1 in a fourth functional position.

The figures show a motor vehicle assembly unit according to the invention, comprising a quick connector 1 and a motor vehicle fluid line 2. The quick connector 1 includes an insertion end 3 in which the fluid line 2 is inserted. A connection section 8 of the quick connector 1 is preferably, and in the embodiment example, disposed at the end opposite the insertion end 3, which has a tube receiving opening 9 for accommodating a tube 10. The tube receiving opening 9 preferably, and in the embodiment example, includes locking projections 11, wherein the locking projections 11 can be engaged with by a projection element 12 designed in the form of an annular buckling on the outer surface of the tube 10. There is a securing spike 4 on the insertion end 3 of the quick connector 1, which is encompassed by an outer sleeve 5.

An annular insertion space is disposed between the securing spike 4 and the outer sleeve 5, into which the fluid line 2, or the fluid line end, respectively, is inserted.

Figure 2:
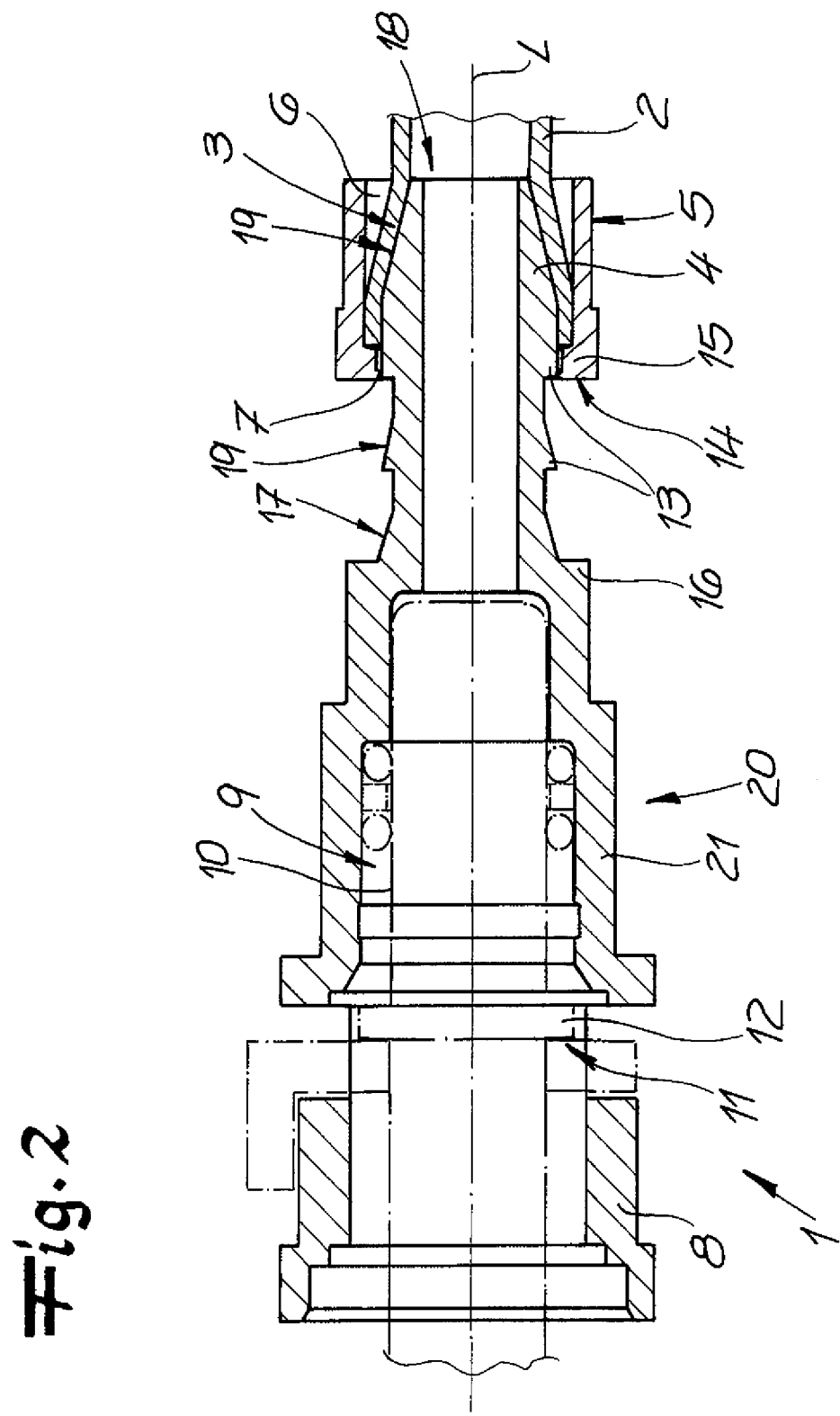
Figure 3:
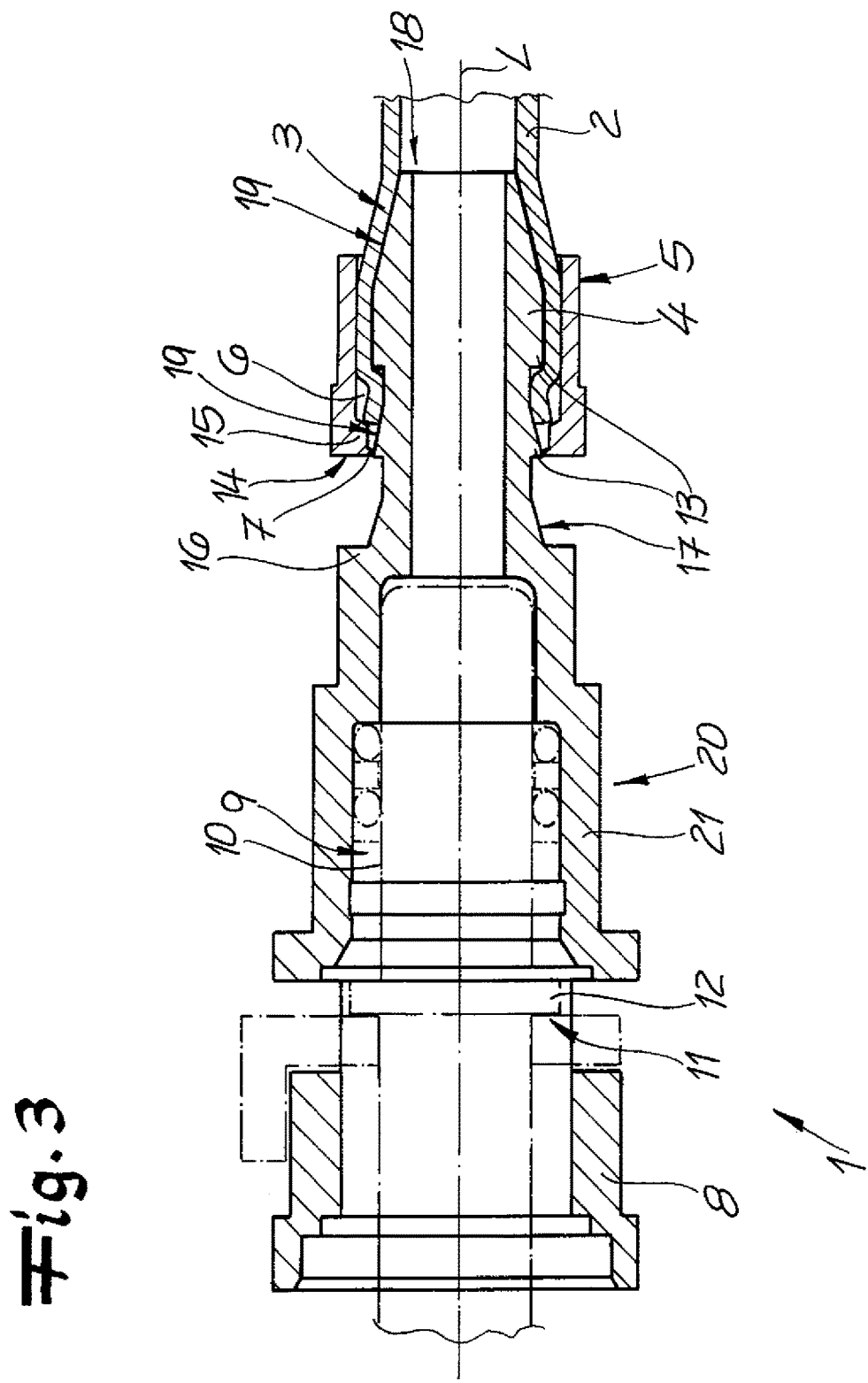
Figure 4:
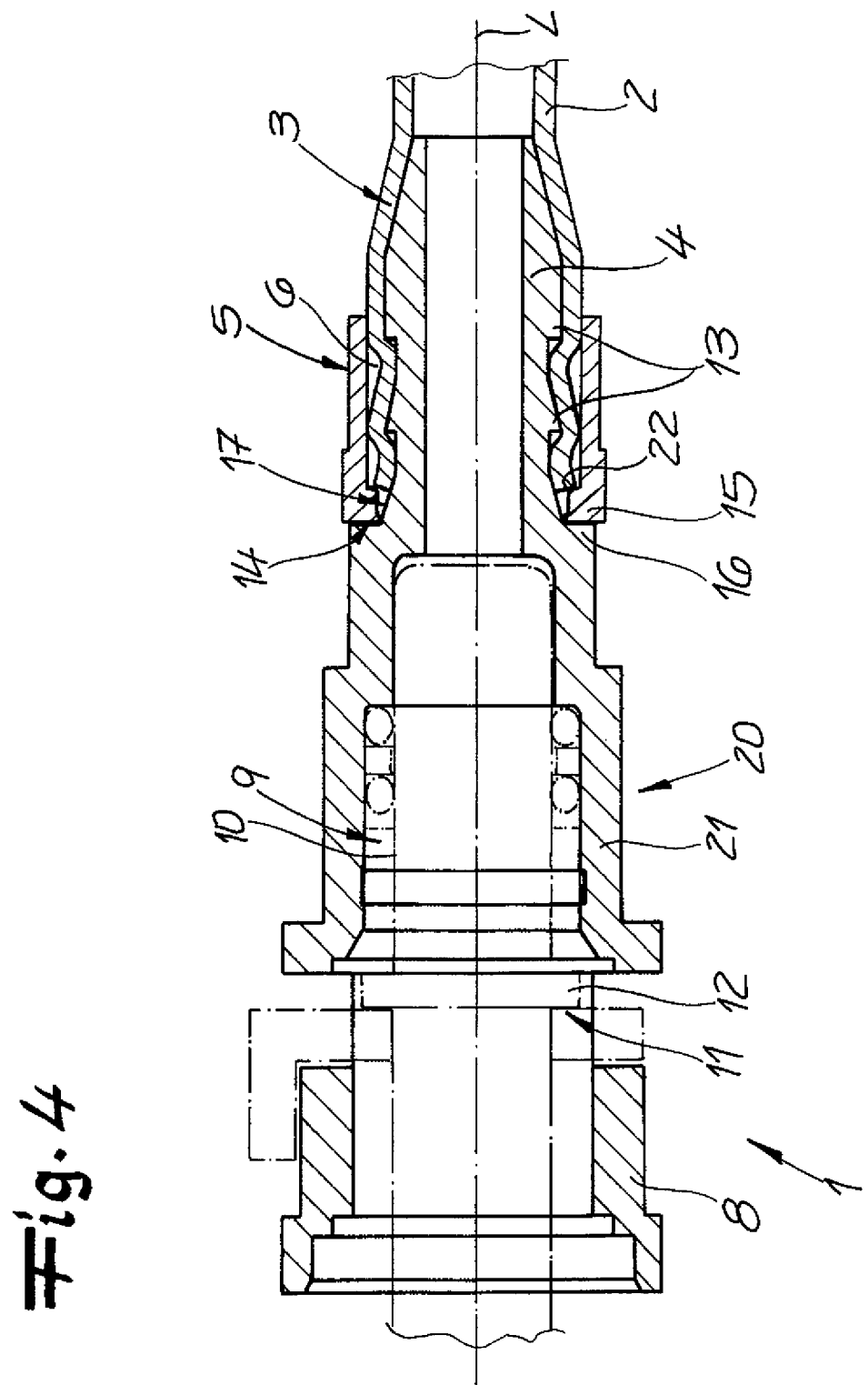

FIG. 1 shows the quick connector 1 with the fluid line 2 not yet inserted. The outer sleeve 5 is designed for practical purposes, and in the embodiment example, as a cylinder, and preferably, and in the embodiment example, runs over the outer circumference of the quick connector 1, or the securing spike 4, respectively. Ideally, and in the embodiment example, the outer sleeve 5 is connected to the securing spike 4 by a break-away element 7 when the fluid line 2 has not yet been inserted. Preferably, and in the embodiment example, the break-away element 7 is an annular break-away element 7, which runs over the entire circumference of the securing spike 4, for practical purposes. The break-away element 7 ideally, and in the embodiment example, consists of plastic, as is the case with the outer sleeve 5 and the securing spike 4. The break-away element 7 is designed with the stipulation that it breaks, or tears, when the fluid line 2 is inserted in the insertion space 6, such that the outer sleeve 5 can then be slid from or with the inserted fluid line 2 further onto the securing spike 4. This can be derived in particular by means of a comparison with the FIGS. 2-4.

It can also be seen from FIG. 1 that, prior to inserting the fluid line 2, the break-away element 7 is preferably, and in the embodiment example, disposed at the connection section-side front end 14 of the outer sleeve 5, and this being directly at the connection section-side front end 14 of the outer sleeve 5. Moreover, preferably, and in the embodiment example, the break-away element 7 is disposed on a pressuring flange 15 running over the inner circumference of the outer sleeve 5, and this being such that the break-away element 7 is preferably oriented there toward the securing spike end. After the break-away element 7 is broken or torn, the fluid line 2 ideally, and in the embodiment example, presses against the pressuring flange 15 with its front end when slid further onto the securing spike 4, such that the outer sleeve 5 can be slid, or further slid, respectively, with the fluid line 2 onto the securing spike 4. The fluid line 2 thus preferably pushes the outer sleeve 5 in front of it when being slid on.

Preferably, and in the embodiment example, the securing spike 4 includes two saw tooth shaped securing contours 13 on its outer surface. Ideally, the fluid line 2 can be slid in a force-locking manner onto these securing contours 13 (see, in particular, FIG. 4). The fluid line 2 is thus basically clamped between the outer sleeve 5 and the securing contours 13 here. Preferably, and in the embodiment example, the saw tooth shaped securing contours 13 each include a conical section 19, wherein the cone of the conical section 19 tapers toward the fluid line-side front end of the securing spike 4. This design facilitates the sliding of the fluid line 2 onto the securing spike 4.

For practical purposes, and in the embodiment example, the outer sleeve 5 lies at its front end against a stopping flange 16 of the quick connector 1 after it has been slid onto the securing spike 4, or after it has been fully slid onto the securing spike 4, respectively. The outer sleeve 5 thus is held in place against this stopping flange 16 of the quick connector 1 after it has been fully slid into place. Preferably, and in the embodiment example, the stopping flange 16 runs over the outer circumference of the quick connector 1. It is recommended that the stopping surface of the stopping flange 16 is disposed such that it is perpendicular to the longitudinal axis L of the quick connector 1. Preferably, the front end surface of the front end of the outer sleeve 5 is also oriented such that it is perpendicular to the longitudinal axis L of the quick connector 1. The stopping flange 16 is, moreover, ideally, and in the embodiment example, disposed at the connection section-side end of the securing spike 4. It has been shown to be advantageous that the securing spike 4 includes a conical section 17, wherein the cone of this conical section 17 tapers toward the fluid line-side front end 18. According to a preferred embodiment, and in the embodiment example, the outer sleeve 5 can be slid in a force-locking or form-locking manner onto the conical section 17. This can be seen, in particular, through a comparison of the FIGS. 3 and 4. Thus, the outer sleeve 5 can be basically clamped onto the conical section 17, and ideally the pressuring flange 15 lies against the conical section 17 in a pre-tensioned manner. It can be seen in the figures that preferably, and in the embodiment example, the conical section 17 of the securing spike 4 is disposed in front of the stopping flange 16 of the quick connector 1, seen from the direction in which the outer sleeve 5, or the fluid line 2, respectively, is slid. For practical purposes, and in the embodiment example, when the outer sleeve 5 is fully slid on (FIG. 4), a front end 22 of the fluid line 2 lies in a sealing manner against the pressuring flange 15 of the outer sleeve 5. In this manner, an effective protection of the fluid line end from disadvantageous external influences, such as spray water, for example, is ensured.

In the figures the quick connector 1 is depicted in the form of a basic element 20, wherein the basic element 20 includes the connection section 8, a middle section 21, the securing spike 4 and the outer sleeve 5. Preferably, and in the embodiment example, this basic element is designed as a one-piece injection molded component, and is thus produced in the framework of an injection molding procedure. Preferably, the outer sleeve 5, in particular, is connected in a one-piece manner to the securing spike 4 by means of the break-away element 7, prior to being slid onto the fluid line 2 (FIG. 1). As explained already above, the break-away element 7 breaks when the fluid line 2 is inserted, or when the break-away element 7 is pressed against by the fluid line 2.

The basic element 20 depicted in the figures can fundamentally also be encompassed by a plastic sheathing, not shown. In this case, the basic element 20, together with this plastic sheathing, forms the quick connector 1. As such, the basic element 20 can be enclosed in a plastic, for example, or the basic element 20 can also be accommodated in a housing, which is not depicted.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A motor vehicle assembly unit for connecting a fluid line having a fluid line end to a tube, the motor vehicle assembly comprising:
   a connector
   including an insertion end for the insertion of the fluid line end, wherein there is a securing spike on the insertion end, which is encompassed by an outer sleeve consisting of plastic and including a pressuring flange, against which the fluid line end presses when slid onto the securing spike, wherein an annular insertion space for the fluid line end of the fluid line, is disposed between the securing spike and the outer sleeve, wherein the outer sleeve is connected to the securing spike by means of at least one break-away element, wherein the at least one break-away element is designed to break when the fluid line end is slid into the annular insertion space, such that the outer sleeve can be slid by the inserted fluid line onto the securing spike, or further onto the securing spike.

2. The motor vehicle assembly unit according to claim 1, wherein the connector is a quick connector, and includes a connection section, which is equipped with a tube receiving opening for accommodating a tube.

3. The motor vehicle assembly unit according to claim 2, wherein the tube receiving opening includes at least one locking projection, wherein the at least one locking projection can be engaged with by at least one projection element on the outer surface of the tube.

4. The motor vehicle assembly unit according to claim 2, wherein the at least one break-away element is disposed on a front end of the outer sleeve proximate to the connection section.

5. The motor vehicle assembly unit according to claim 1, wherein the securing spike includes at least one securing contour on its outer surface, and wherein the fluid line end can be slid onto the at least one securing contour in a friction-locking manner.

6. The motor vehicle assembly unit according to claim 5, wherein the at least one securing contour includes a conical section and wherein the conical section tapers toward a free front end of the securing spike.

7. The motor vehicle assembly unit according to claim 1, wherein the outer sleeve lies with a front end against a stopping flange of the connector in an assembled state.

8. The motor vehicle assembly unit according to claim 1, wherein the securing spike includes a conical section, wherein the conical section tapers toward a free front end of the securing spike, and wherein the outer sleeve can be slid in a friction-locking manner onto the conical section.

9. The motor vehicle assembly unit according to claim 8, wherein the conical section of the securing spike is disposed in front of a stopping flange, when viewed from the direction in which the outer sleeve is slid on.

10. The motor vehicle assembly unit according to claim 8, wherein the outer sleeve can be slid in a friction-locking manner with its pressuring flange onto the conical section.

11. The motor vehicle assembly unit according to claim 1, wherein the outer sleeve is connected as a single unit to the securing spike by means of the at least one break-away element.

12. The motor vehicle assembly unit according to claim 1, wherein at least a basic element of the connector is a single plastic element.

13. The motor vehicle assembly unit according to claim 12, wherein the basic element includes the connection section, the securing spike, and the outer sleeve and is a single injection molded component.

14. A method for the production of a motor vehicle assembly unit the method comprising the steps of
   providing a connector and a motor vehicle fluid line, wherein the connector has a basic element with a securing spike on an insertion end and with an outer sleeve encompassing the securing spike and connected to the securing spike by at least one break-away element, the outer sleeve consisting of plastic,
   sliding a fluid line end of the fluid line into an annular insertion space formed between the outer sleeve and the securing spike,
   pressing the fluid line end against a pressuring flange of the outer sleeve such that the at least one break-away element breaks, and
   sliding the fluid line end and the outer sleeve further onto the securing spike.

15. The method according to claim 14, wherein the basic element is produced by means of an injection molding process.

\* \* \* \* \*